July 29, 1941.  G. ABEL  2,250,981
ELECTRIC TRANSMITTER UNIT
Filed May 11, 1940   2 Sheets-Sheet 1

Inventor
George Abel
By
Henry J Miller
Attorney

Witness:
Godfrey Pecina

July 29, 1941.　　　　G. ABEL　　　　2,250,981
ELECTRIC TRANSMITTER UNIT
Filed May 11, 1940　　　2 Sheets-Sheet 2

Inventor
George Abel

Witness:
Godfrey Pecina

By Henry J Miller
Attorney

Patented July 29, 1941

2,250,981

UNITED STATES PATENT OFFICE 2,250,981

ELECTRIC TRANSMITTER UNIT

George Abel, Plainfield, N. J., assignor to The Singer Manufacturing Company, Elizabeth, N. J., a corporation of New Jersey Application May 11, 1940, Serial No. 334,519

6 Claims. (Cl. 192—18)

This invention relates to devices for transmitting power and more particularly to a clutch and brake combined with an electric motor and used for driving sewing machines and the like.

One of the objects of this invention is to provide an improved arrangement of the motor and clutch elements to insure the correct alignment of the driving and driven elements.

Another object of this invention is to provide a construction in which a high or low speed drive for the pulley may be obtained by a change of gearing.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 2:
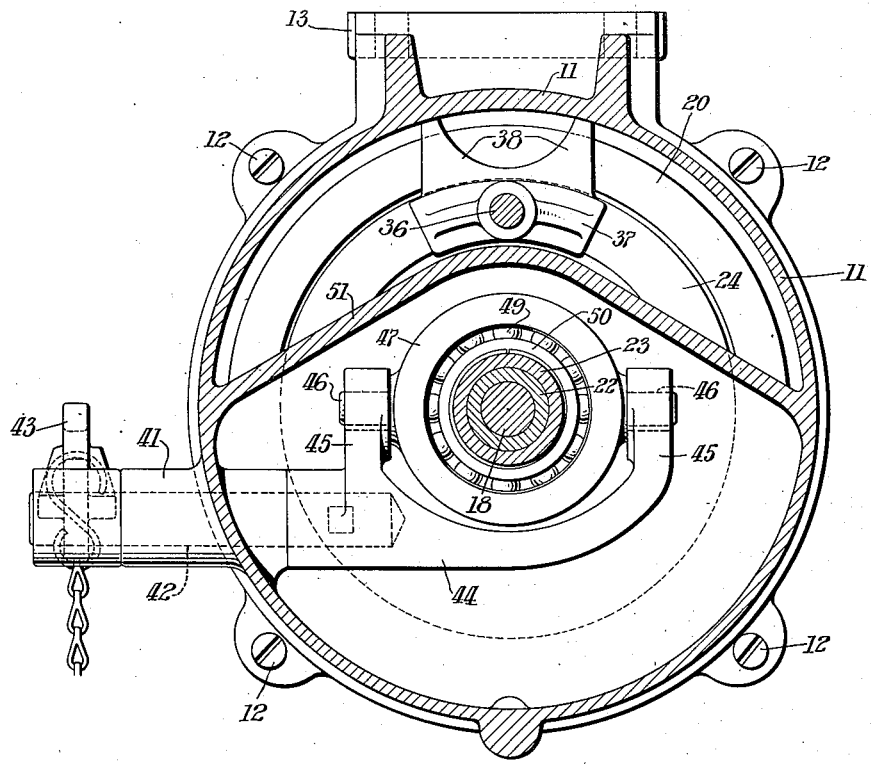
Fig. 2 is a section taken along the line 2—2 of Fig. 1.

In the embodiment of the invention selected for illustration, the transmitter comprises a tubular housing formed in two parts 10 and 11 which are secured together by the screws 12, (Fig. 2) the part 11 being formed with feet 13 which are adapted to be secured to the under side of a sewing machine table or the like. The part 10 has fixed to it the usual field core 14 having incorporated therein the conventional exciting winding 15. Journaled in the bearings 16 and 17 is a shaft 18 carrying the rotor 19, which may be of the ordinary squirrel-cage induction type.

A flywheel or driving element 20 is keyed to the shaft 18 intermediate its ends and is provided with a friction disk 21. Rotatably and slidably mounted on the shaft 18 is a bearing sleeve 22 which carries the tubular hub 23 of a disk shaped driven element 24 of the clutch. Fixed to the hub 23 is a gear 25 which meshes with a gear 26 fixed to one end of the shaft 27 by the tapered pin 28. The shaft 27 is journaled in the bearings 29 and 30 and is held in the bearings against endwise movement by the hub of the gear 26 and a collar 31 fixed to the shaft 27 by the set-screw 32. The driving pulley 33 may be fixed to the shaft 27 in any suitable manner and is held thereon by the nuts 34.

Extending through the end wall of the cup-shaped part 11 of the frame is a screw-threaded brake-supporting rod 36. To the end of the rod which extends into the housing there is swiveled a brake-shoe 37 having arms 38 which engage the inner wall of the housing to prevent the brake-shoe 37 from turning relative to the rod 36. The working clearance between the brake-shoe 37 and the live clutch element 21, for the driven element 24, may be readily adjusted by turning the rod 36 in the frame member 11; a locking nut 40 being provided to tighten the rod 36 in its adjusted position.

Figure 1:
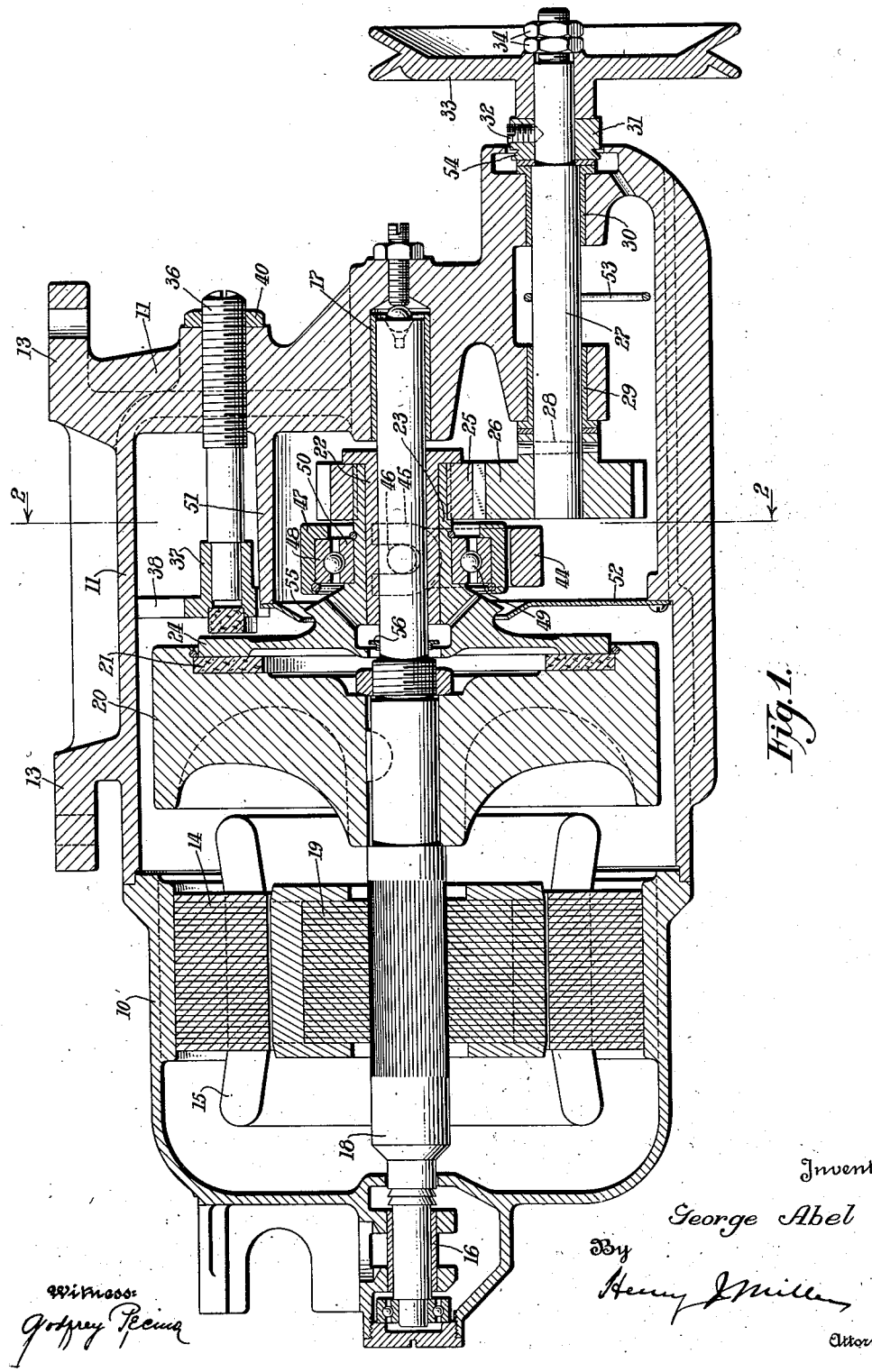
Fig. 1 is a vertical sectional view taken through the center of the transmitter.

To shift the driven element 24 into engagement with either the brake or live clutch element the side wall of the part 11 of the casing is formed with a boss 41 (Fig. 2) in which is journaled a rock-shaft 42 having an actuating lever 43 fixed to the end outside of the housing and a member 44 fixed to the end inside of the housing. The member 44 is formed with two arms 45 which are bifurcated at their upper ends (dotted lines Fig. 1) to receive the trunnions 46 formed on the circular member 47 which embraces and has fixed thereto the outer race 48 of the ball bearing 49; the inner race 50 of the bearing being fixed to the hub 23 of the driven element 24. From the foregoing it will be understood that when the lever 43 is actuated the arms 45 of the member 44 will, through the ball bearing 49, shift the driven element into engagement with either the driving element or the brake for the purpose of starting or stopping the driving pulley 33.

In order to operate the gears and shifting mechanism for the driven element in a bath of oil, the end of the cup-shaped part 11 of the housing is formed with an inwardly extending wall 51 which is arched upwardly over the actuating mechanism, (see Fig. 2), and a closure plate 52 is secured to the side walls of the tubular housing and the ends of the wall 51, thereby forming an oil compartment in one end of the housing. The gear 26 and oil-ring 53 will splash the oil in the bottom of the compartment sufficiently to lubricate all of the parts and the oil is prevented from escaping by the oil sling 54 formed on the collar 31, the oil thrower 55 formed on the hub of the driven element 24 and the oil sling 56 fixed to the shaft 18.

From the foregoing it will be understood that both the flywheel 20 and the driven element 24 are carried by the same shaft and therefore their axes coincide and are in perfect alignment. Also the shaft 27 which carries the driving pulley is journaled in separate bearings which will take the pull of the belt and as the shaft 27 is connected to the driven element by spur gearing a slight sidewise thrust of the shaft 27 will not affect the alignment of the driving and driven elements. It will also be understood that the gears 25 and 26 may be changed, that is, the gear 25 may be made smaller and the gear 26 larger to provide a lower R. P. M. of the pulley 33, and conversely, the gear 26 may be made smaller and the gear 25 larger to provide a higher R. P. M. of the pulley 33. From the above it will be obvious that a single motor may be used for both a high speed and low speed transmitter, thereby reducing tool cost and inventories.

Having thus set forth the nature of the invention what I claim herein is:

1. A unitary motor and power-transmitter comprising a housing, a constantly rotating motor-shaft having its ends journaled in said housing, a driving element including a fly wheel carried by said shaft, a driven element carried by said shaft and movable longitudinally thereon, a brake element carried by said housing and adapted to be engaged by said driven element, a pulley carrying shaft located interiorly of and journaled in said housing and means for operatively connecting said driven element with said shaft.

2. A unitary motor and power-transmitter comprising a housing, a constantly rotating motor-shaft having its ends journaled in said housing, a driving element including a fly wheel carried by said shaft, a driven element carried by said shaft and movable longitudinally thereon, a brake element carried by said housing and adapted to be engaged by said driven element, a pulley carrying shaft journaled in said housing and having one of its ends extending through the wall of said housing, and gearing connecting said driven element with said shaft.

3. A unitary motor and power-transmitter comprising a tubular housing, an electric motor within said housing, a driving clutch element including a fly wheel actuated by the motor-shaft, a driven clutch element in axial alignment with and carried by the motor-shaft, a brake element, means for moving said driven clutch element laterally to cause it to engage either said driving element or said brake element, a shaft journaled in said casing and having one of its ends extending therefrom, a pulley carried by the extending of said shaft, and gearing located entirely within the housing for operatively connecting said shaft with the driven clutch element.

4. A unitary motor and power-transmitter comprising a tubular housing, an electric motor within said housing and having a shaft journaled in the end walls of the housing, a driving clutch element actuated by the motor-shaft, a driven clutch element in axial alignment with the motor-shaft and carried thereby, a brake element, means for moving said driven clutch element laterally to cause it to engage either the driving element or the brake element, a wall formed on one end of the housing, a closure plate which together with the wall and housing form an oil compartment, a driving shaft extending through the housing and into the oil compartment, a pulley secured to the end of the driving shaft outside of said housing, and gearing located within the oil compartment for operatively connecting said driving shaft with said driven element.

5. A unitary motor and power-transmitter comprising a tubular housing, a constantly rotating motor-shaft journaled in said housing, a driving element carried by said shaft, a sleeve slidable on said shaft, a driven element carried by said sleeve, a stationary brake element carried by said housing, means for shifting said driven element into engagement with the driving element or the brake element to start and stop said driven element, a driving shaft located within the housing and having one of its ends extending through one of the walls of the housing, gearing connecting said shaft with the driven element and driving means secured to the end of the driving shaft outside of the housing.

6. A unitary motor and power-transmitter comprising a tubular housing having an end wall at each end, a motor located within said housing and having the ends of its shaft journaled in the end walls of the housing, a constantly rotating driving element carried by said shaft, a sleeve slidable on said shaft, a driven element carried by said sleeve, a brake element carried by the housing, manual means for shifting said driven element to engage the driving element or the brake element, a driven shaft extending through one of the end walls of the housing, and gearing located within said housing and connecting the driven element with the driven shaft.

GEORGE ABEL.